(12) United States Patent
Lancaster-Larocque et al.

(10) Patent No.: US 9,312,066 B2
(45) Date of Patent: Apr. 12, 2016

(54) MAGNETIC SHAPE OPTIMIZATION

(75) Inventors: Simon Regis Louis Lancaster-Larocque, Gloucester (CA); Ryan M. Satcher, San Jose, CA (US)

(73) Assignee: Apple Inc., Cupertino, CA (US)

( * ) Notice: Subject to any disclaimer, the term of this patent is extended or adjusted under 35 U.S.C. 154(b) by 697 days.

(21) Appl. No.: 13/604,606

(22) Filed: Sep. 5, 2012

(65) Prior Publication Data

US 2013/0175242 A1 Jul. 11, 2013

Related U.S. Application Data

(60) Provisional application No. 61/584,760, filed on Jan. 9, 2012.

(51) Int. Cl.
| | | |
|---|---|---|
| *H01F 41/02* | (2006.01) | |
| *B28D 1/02* | (2006.01) | |
| *B23H 1/00* | (2006.01) | |
| *B23H 7/10* | (2006.01) | |
| *B23H 9/00* | (2006.01) | |
| *B28D 1/00* | (2006.01) | |
| *B23D 57/00* | (2006.01) | |
| *B28D 1/04* | (2006.01) | |
| *B28D 1/08* | (2006.01) | |

(52) U.S. Cl.
CPC ........ *H01F 41/0253* (2013.01); *B23D 57/0023* (2013.01); *B23H 1/00* (2013.01); *B23H 7/10* (2013.01); *B28D 1/00* (2013.01); *B28D 1/02* (2013.01); *B28D 1/041* (2013.01); *B28D 1/08* (2013.01); *Y10T 29/49789* (2015.01)

(58) Field of Classification Search
CPC ........ B23D 57/0023; B23H 1/00; B23H 7/10; B23H 7/101; B28D 1/00; B28D 1/02; B28D 1/041; B28D 1/08; H01F 41/0253
See application file for complete search history.

(56) References Cited

U.S. PATENT DOCUMENTS

| | | | | |
|---|---|---|---|---|
| 4,193,852 | A * | 3/1980 | Inoue | 205/651 |
| 5,609,148 | A * | 3/1997 | Mitwalsky et al. | 125/16.01 |
| 5,865,162 | A * | 2/1999 | Kambe | B23D 57/0053 |
| | | | | 125/16.02 |
| 6,145,422 | A * | 11/2000 | Katamachi et al. | 83/74 |
| 6,265,793 | B1 | 7/2001 | Korenaga | |
| 6,806,615 | B2 | 10/2004 | Enomoto et al. | |
| 6,945,242 | B2 * | 9/2005 | Kondo et al. | 125/21 |
| 7,235,910 | B2 | 6/2007 | Decristofaro et al. | |

(Continued)

FOREIGN PATENT DOCUMENTS

| | | |
|---|---|---|
| JP | 61226224 | 10/1986 |
| JP | 62-009821 A * | 1/1987 |

(Continued)

OTHER PUBLICATIONS

Lancaster-Larocque, et al., "Multi-Wire Cutting for Efficient Magnet Machining", U.S. Appl. No. 13/213,481, filed Aug. 2011.

*Primary Examiner* — Geoffrey S Evans
(74) *Attorney, Agent, or Firm* — Downey Brand LLP

(57) ABSTRACT

A method for efficiently machining magnets with curved surfaces is disclosed. The use of machining equipment capable of making curved cuts through magnetic material can allow significant cost and material savings, particularly when machining magnets with complementary surfaces. A process for using a series of cutting wires to simultaneously cut magnetic material into conformally shaped magnets is described.

11 Claims, 12 Drawing Sheets

(56) References Cited

U.S. PATENT DOCUMENTS

| | | |
|---|---|---|
| 7,609,139 B2 | 10/2009 | Bird et al. |
| 7,906,743 B2 | 3/2011 | Sheu |
| 2004/0255924 A1* | 12/2004 | Kondo ............... B23D 57/0053 125/41 |
| 2008/0149085 A1* | 6/2008 | Skovgaard-Soerensen .... 125/21 |
| 2009/0090409 A1* | 4/2009 | Moczygemba ............... 136/201 |
| 2010/0112904 A1* | 5/2010 | Sato et al. ....................... 451/28 |
| 2012/0272944 A1* | 11/2012 | Coustier et al. ................. 125/21 |

FOREIGN PATENT DOCUMENTS

| | | | |
|---|---|---|---|
| JP | 1-281835 A | * | 11/1989 |
| TW | I235088 | | 7/2005 |
| WO | WO-2011/032599 A | * | 3/2011 |

* cited by examiner

MAGNETIC SHAPE OPTIMIZATION

CROSS-REFERENCE TO RELATED APPLICATION

This application claims priority to and benefit under 35 U.S.C. 119(e) of U.S. Provisional Patent Application No. 61/584,760, filed Jan. 9, 2012, and entitled "MAGNETIC SHAPE OPTIMIZATION", the entire disclosure of which is hereby incorporated by reference.

BACKGROUND

1. Technical Field

This disclosure relates generally to methods for minimizing material waste when cutting complex magnet shapes.

2. Related Art

Magnets made from ceramic materials are quite brittle, resulting in a low mechanical strength. Because of this material property, special cutting tools are used when machining this particular class of magnets in order to prevent cracking or fracture of the magnets during the machining process. In many cases the cost of raw materials is quite high; therefore, any waste of material is highly undesirable. Diamond saws, which consist of diamond coated discs of roughly 0.3-0.4 millimeters in width are a common tool employed to make precision cuts into brittle, ceramic-based magnets. Unfortunately, conventional diamond saws are generally limited to creating straight cuts. Consequently, when a diamond saw is used to cut ceramic magnets non-linear surfaces are typically achieved by grinding away excess material off the surface of the magnet to create a curved surface. In many cases the grinding and polishing necessary to achieve a non-linear surface adds a significant amount of extra time and labor to the manufacturing process. Moreover, since the raw materials of a magnet can be quite costly, grinding away material in a manner that essentially destroys the excess material is highly undesirable.

Therefore, what is desired is a machining method which allows the initial machining cuts to closely approximate the finished shape of magnets even where curved, or spline-shaped surfaces are required.

SUMMARY

This paper describes various embodiments that relate to a method, apparatus, and computer readable medium for machining magnets with complementary surfaces.

In a first embodiment a multi-wire cutting machine for simultaneously cutting a plurality of complementary magnets from a magnetic substrate is disclosed. The multi-wire cutting machine includes at least the following: (1) a number of cutting wire groups, each of the cutting wire groups including a number of parallel cutting wires (at least two of the cutting wire groups are oriented in different directions, and are separated by a standoff distance preventing interference between the cutting wire groups during a cutting operation); (2) a workpiece holder suitable for securing the magnetic substrate (the cutting wires and the workpiece holder cooperate to cut the magnetic substrate into a pre-determined number of conformally shaped magnets; and (3) a working fluid application mechanism. The working fluid application mechanism immerses the portions of the plurality of wires that are in close proximity to the magnetic substrate with working fluid.

In another embodiment a machining method is disclosed. The machining method includes at least the following steps: (1) coupling a magnetic substrate to a workpiece holder; (2) in a first cutting operation, simultaneously cutting the magnetic substrate into a number of magnetic slices; and (3) in a second cutting operation, simultaneously cutting each of the magnetic slices into at least two magnets having at least one complementary curved surface therebetween. The first and second cutting operations are performed by a first and second set of parallel cutting wires. The first set of parallel cutting is oriented orthogonal with respect to the second set of parallel cutting wires.

In yet another embodiment a non-transitory computer readable medium for storing computer instructions executed by a processor in a computer numerical control component of a wire cutting machine is disclosed. The computer readable medium is for cutting a magnetic substrate into a plurality of conformal pieces to form at least two magnets having complementary shapes. The computer readable unit includes at least the following: (1) computer code for controlling wire spooling rate, wire cutting speed, and wire path of a number of cutting wires; (2) computer code for moving a workpiece holder in at least two axes, the multi-axis movement for machining complex shapes out of the workpiece; and (3) computer code for maintaining a minimum clearance distance between at least two anti-parallel sets of cutting wires.

BRIEF DESCRIPTION OF THE DRAWINGS

The embodiments will be readily understood by the following detailed description in conjunction with the accompanying drawings, wherein like reference numerals designate like structural elements, and in which.

DETAILED DESCRIPTION OF EXAMPLE EMBODIMENTS

Figure 1:
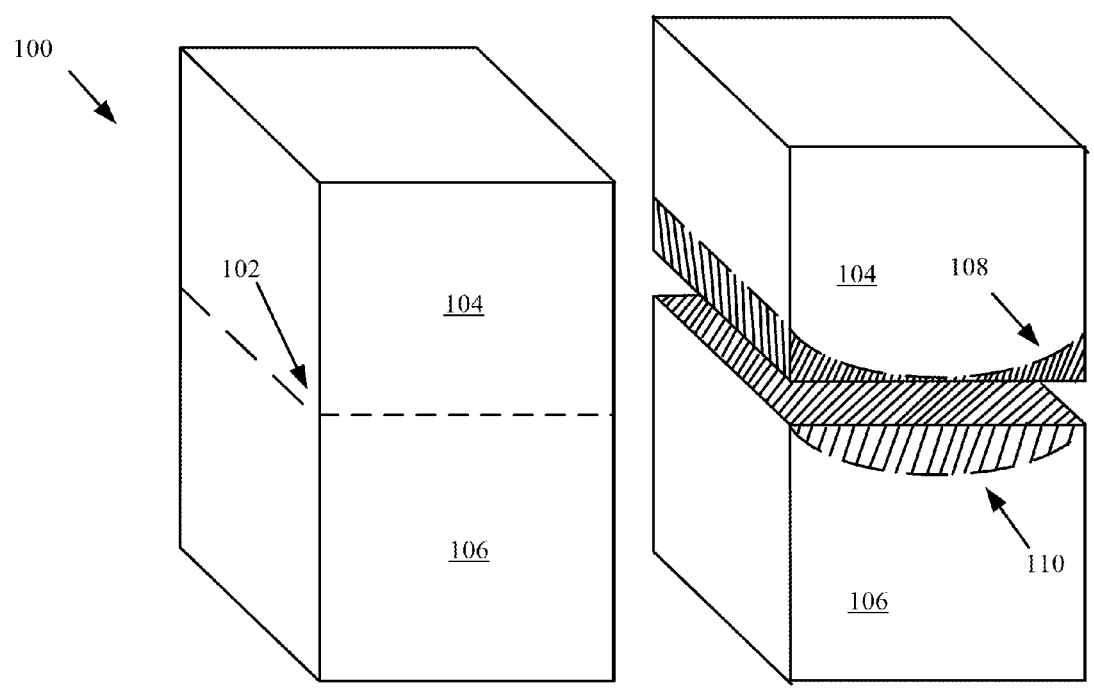
FIG. 1 illustrates how complementary curved surfaces are cut into a ceramic magnet using a conventional diamond saw and abrasive tools.

Representative applications of methods according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

Permanent magnets made of rare earth elements are the strongest type of permanent magnets and have significant advantages over ferrite or alnico magnets. Currently the strongest type of rare earth magnet is made from a sintered neodymium alloy including neodymium, iron, and boron. The introduction of more powerful permanent magnets has allowed a much larger range of applications to be filled by permanent magnets in modern products. Motors in cordless tools, hard disk drives, and magnetic fasteners all benefit from recent advances in this technological field. In addition to superior field strength, the fields of rare earth element can be directed and shaped with much more precision than is possible with other types of magnet. Unfortunately, rare earth magnets are ceramic in nature and therefore quite brittle and susceptible to cracks and shearing if not processed with care.

The brittle material properties of ceramic magnets make specialized machining methods quite important. Diamond saws are typically used to cut ceramic magnets, and can adequately prevent cracking or damage to the magnets during the cutting process due to the narrow and precise cut enabled by the thin saw. Unfortunately when a spline-shaped piece is desired the machining step requires more material since the flat diamond saw blade cannot follow the contour of a spline-shaped surface. Since the raw materials of a magnet can be quite costly, grinding away material in a manner that makes the excess material unfit for further use is highly undesirable. The following cutting tools can be employed to make a curved cut through brittle magnetic material: (1) wire electrical discharge machining (EDM); (2) wire saw machining; and (3) a hollow circular cutter.

One tool with the flexibility to allow for curved spline-shaped surfacing is wire EDM. In addition to its ability to make curved cuts, wire EDM methods can be considerably more efficient at conserving materials than conventional cutting methods. In wire EDM a wire is continuously fed across a set of electrodes. The electrodes feed an amount of electricity sufficient to melt a portion of a workpiece with the portion of the wire between the electrodes. The voltage and current of the electricity is alternated so as to prevent electrolysis from causing wide spread damage to the surface of the workpiece. The alternating current causes sparks between the workpiece and the wire; each spark generated has enough energy to melt or vaporize small portions of both the workpiece and the wire. A working fluid submerses or is continuously sprayed over the electrified wire portion, keeping it cool and flushing away the melted waste material. Because wires with diameters as small as 0.1-0.2 mm can be used, the amount of waste material is kept to a minimum. The narrow wire diameter results in a cut size, or kerf of about 0.12-0.22 mm in width since the wire removes material from the sides as it moves through the workpiece as well as directly below it. As should be appreciated, since the kerf size can be about half the size of other cutting methods such as diamond saws the amount of waste material savings solely from the cutting tool choice can cut losses in half. Another advantage of wire EDM is that it can produce finished cuts. By varying the parameters of a wire EDM machine surface roughness can be radically reduced when compared to the surface finish of the diamond coated discs.

Another appropriate tool for cutting curved surfaces is a wire saw machine. Wire saw machines can have much the same configuration as wire EDM machines since they run wires across a surface of a workpiece to accomplish cutting operations. The primary difference is that wire saw machines use a diamond coated wire to abrasively cut a workpiece, whereas the wire EDM machine wires don't touch the workpiece at all since it relies on electrical sparking. Since electrical sparking does not take place in the wire saw machining method an occasional lapse in working fluid does not typically result in wire breakage. Although wire saw machines run slightly faster than wire EDM machines, it is still a rather slow time consuming machining process. Unfortunately, the size of the cut tends to run a little larger than the cut produced with wire EDM. Both wire cutting processes allow enormous efficiencies when compared with machining tools which only allow for linear cuts.

Yet another tool capable of producing a curved cut through brittle magnetic material is a hollow circular cutter. The hollow circular cutter is essentially a spinning saw that presents a circular cross section to the portion of a workpiece to be cut. This configuration allows circular or curved cuts to be made in a workpiece. The cutting portion of the circular cutter can be diamond encrusted, allowing it to have a fine, sharp edge, thereby minimizing the amount of stress placed on the workpiece while the cutting operation takes place.

These and other embodiments are discussed below with reference to FIGS. 1-10; however, those skilled in the art will readily appreciate that the detailed description given herein with respect to these figures is for explanatory purposes only and should not be construed as limiting.

Figure 2A:
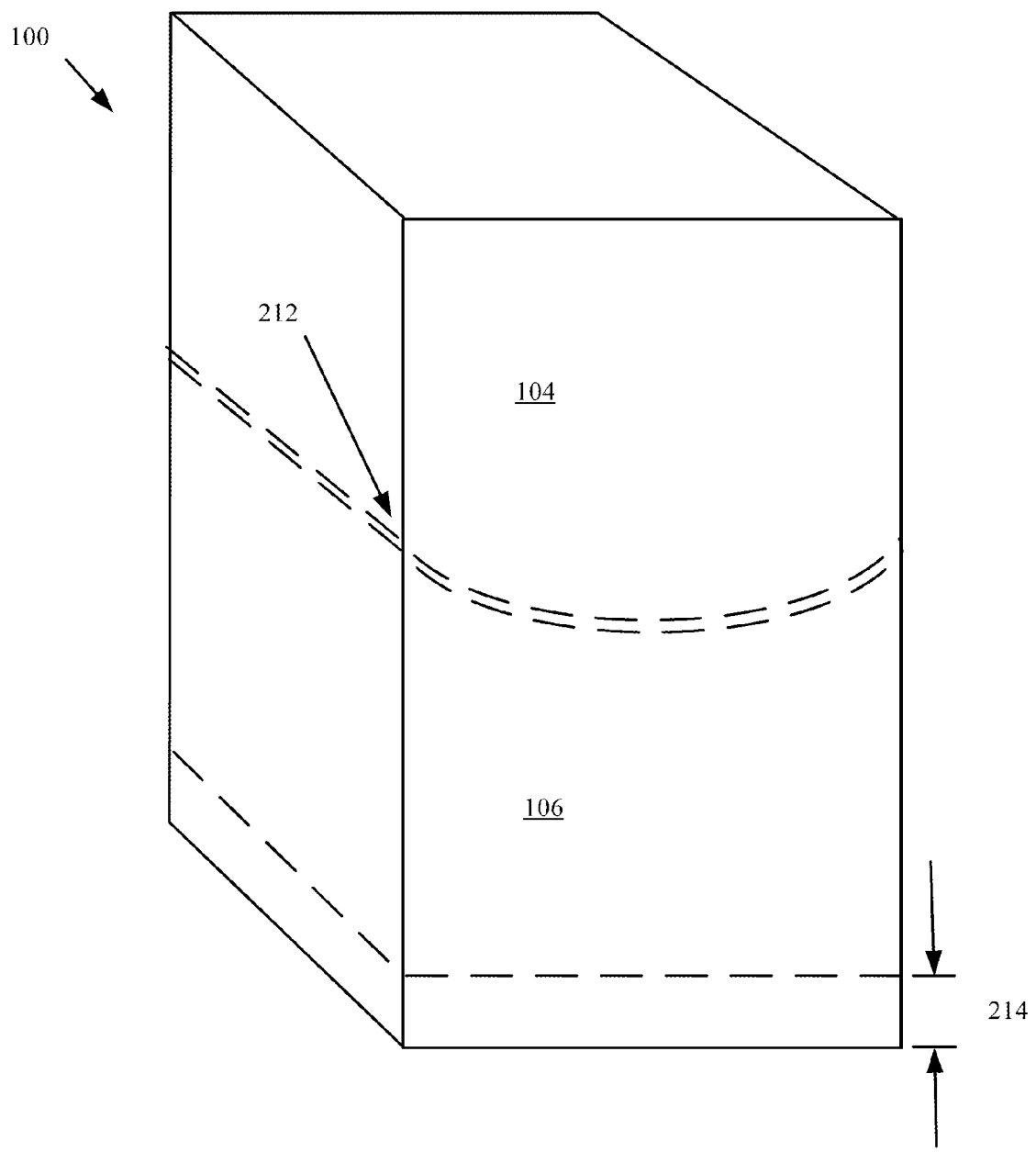
FIG. 2A illustrates the material savings obtained by employing a cutting machine capable of producing curved cuts, as compared to FIG. 1.

FIGS. 1 & 2A show how much material the described embodiment can save when cutting two matching pieces from a single workpiece. In this embodiment the two pieces effectively act like puzzle pieces as they are designed to fit together after the manufacturing process is complete. FIG. 1 shows how this machining process would have to proceed using a linear cutting machine, such as for example a diamond disc saw for cutting magnet block 100. A diamond saw can make cut 102 thereby slicing magnet 100 into upper magnet 104 and lower magnet 106. After the two magnets are separated each would be subject to grinding and surfacing processes to achieve a proper shape and finish. Ground areas 108 and 110 of magnets 104 and 106 respectively would be effectively wasted. The amount of waste from grinding depends upon the final desired curvature between magnets 104 and 106. In some situations where only a slight curvature is desired waste material from grinding might not be terribly significant; however, as the curvature between the complementary magnets 104 and 106 increases, resulting waste from the grinding operation increases rapidly. FIG. 2A shows just how much material can be saved by using the described embodiment. By using a cutting method compatible with curved surfaces, curved cut 212 can be made in a single pass. By making curved cut 212 the time intensive, materially wasteful grinding step can be eliminated, from the process. Consequently, curved cut 212 allows for an overall shorter block to be used, allowing portion 214 of block 100 to be conserved. Following figures illustrate different methods and tools for creating curved cut 112. FIGS. 2B-7 provide information on single wire and multi wire cutting methods, after which this application will describe how wire cutting methods can be used in accordance with the described embodiment.

Figure 2B:
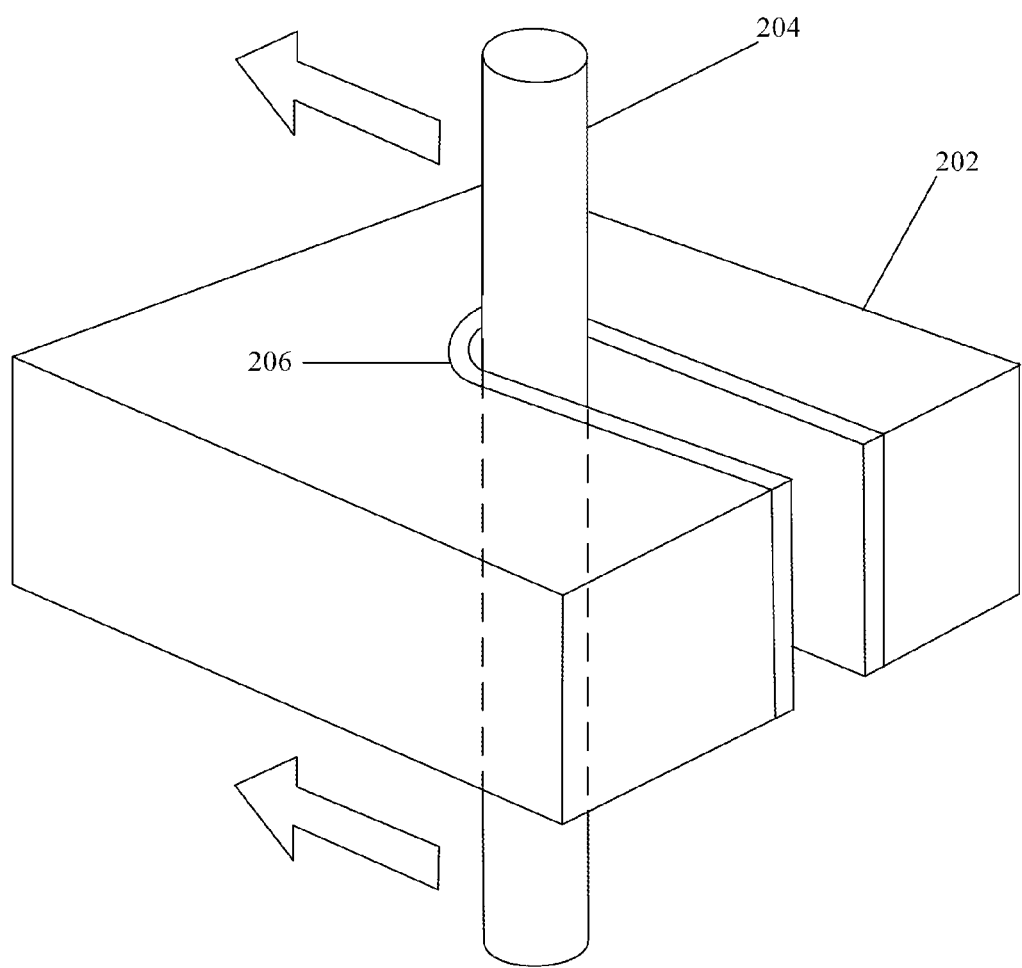
FIG. 2B illustrates a simplified example of a single wire machining process.

FIG. 2B in particular shows a basic example of using wire cutting to machine a workpiece 202. In this illustration only workpiece 202 and wire 204 are shown. Spooling reels, wire guides, water jets and conductivity pieces have been removed for simplicity. In FIG. 2B wire 204 has already cut through a portion of workpiece 202. Wire 204 can be made from a number of different materials. In wire EDM applications a copper coated steel wire can be used having a thickness as small as between 0.1 and 0.2 mm thick. The copper coating helps keep the wire cool by melting during the wire EDM process, which removes energy from the steel wire, keeping it cooler for longer. In wire saw applications the wire is diamond coated and creates a larger cut than an EDM machining tool would; however, even though the minimum kerf width is about 50% larger in wire saw operations than with wire EDM, the wire saw has another advantage in that the heat affected zone is smaller than the one created in the wire EDM process. This leads to a slightly higher quality end product, since more of the magnetic material can be magnetized after the machining process is complete. Regardless, both heat effected zone 206 are relatively small and will not penetrate more than a depth of about 0.01-0.02 mm into the surface of the cut as illustrated. Even when accounting for the loss of the material associated with the heat affected zone the overall loss of material is still substantially smaller than what is lost when having to grind away material to fit a desired curved surface shape.

Figure 3:
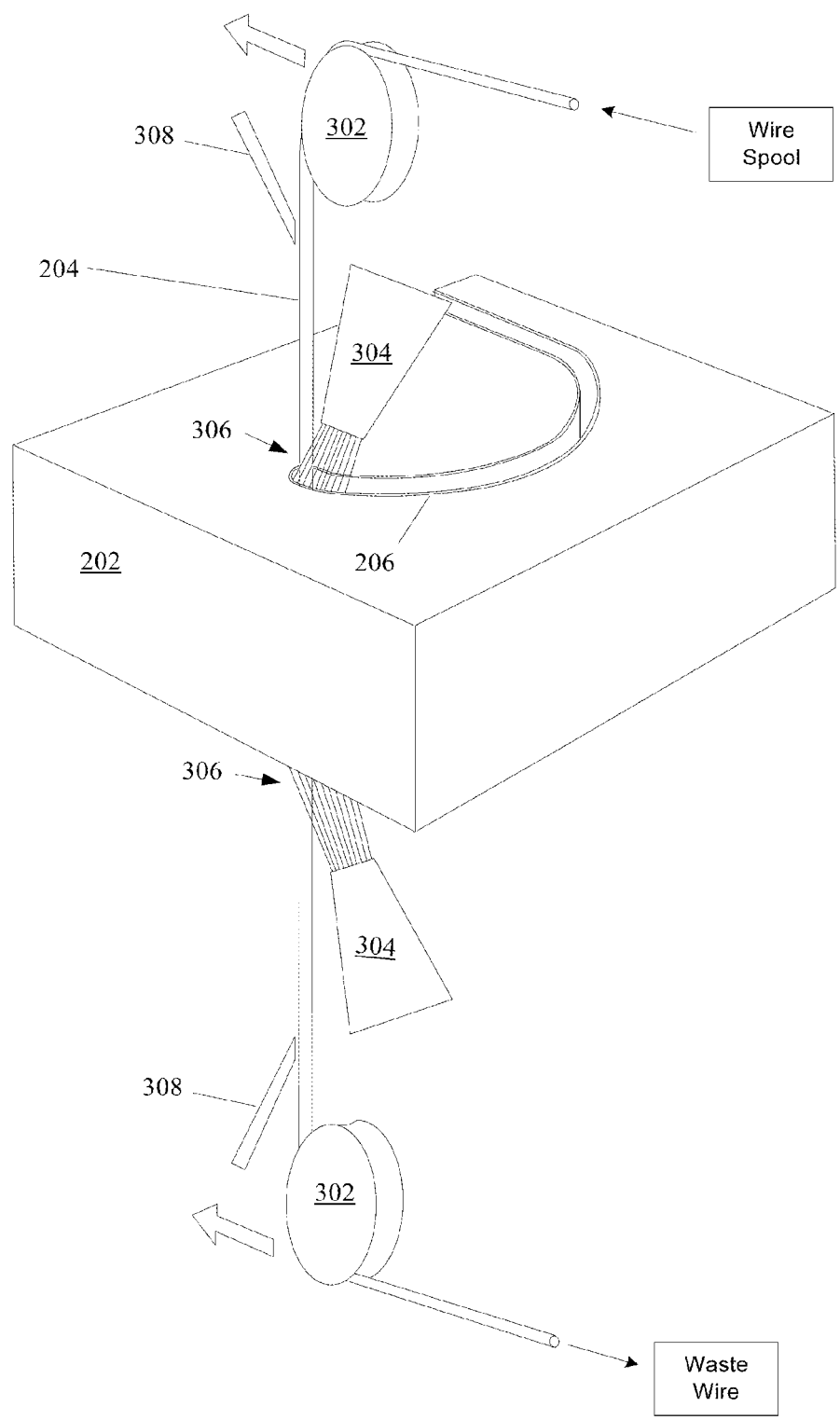
FIG. 3 illustrates a wire cutting machine with nozzle supplied working fluid.

FIG. 3 shows a detailed diagram of one way in which a wire cutting system can be configured. As already shown workpiece 202 is cut by wire 204. However, as suggested above there are a few more important components in the system. First the wire is so thin that using a mostly static wire would either burn up the wire (with Wire EDM) or dissipate the abrasive surface (in the case of the wire saw) extremely quickly. Therefore wire cutting systems use wire guides 302 to direct wire 204 from a spool at speeds of up to 600 meters per minute across the surface of workpiece 202. Wire guides 302 can be diamond wire guides with accuracy as tight as about 0.004 mm. Also important to the wire cutting process is the use of working fluid to continuously cover wire 204 and to flush out waste material from cutting out the kerf. Nozzles 304 can be placed on either side of the surface of workpiece 202 to keep wire 204 continuously covered with working fluid 306, and to flush waste material away so that waste material is prevented from adhering back to the surface of the workpiece. Working fluid 306 can be deionized water. In a wire EDM configuration, if wire 204 is not continuously covered any spark between an uncovered portion of the wire and the workpiece can break wire 204 and delay the machining process until the wire can be rethreaded.

Conversely, a wire saw machine could experience intermittent uncovering, as long as it wasn't too long in duration as this would result in excessive heating from friction of the wire, and eventual breakage due to overheating. In another embodiment workpiece 202 and wire 204 can be submerged in a tank of working fluid while the cutting takes place. This is commonly known as immersion wire cutting. While this method is quite effective at preventing the wire from becoming uncovered it isn't typically as efficient as the nozzles are at flushing waste material away from the cutting area, since a tank can't circulate water across the cutting surface quite as fast as the illustrated nozzles 304 do. One way to ameliorate the waste build up problem in an immersion tank configuration is to modify the composition of the working fluid, using a hybrid electrolyte with a detergent agent instead of simple deionized water. Finally, in a wire EDM embodiment conductivity pieces (or electrodes) 308 are used on either side of workpiece 202 to apply voltage across wire 204, thereby concentrating the electrical charge at a portion of wire 204 in contact with workpiece 202. Conductivity pieces 308 are unnecessary in a wire saw machine as the wire saw relies on abrasion as opposed to wire EDM which requires electricity.

Figure 4A:
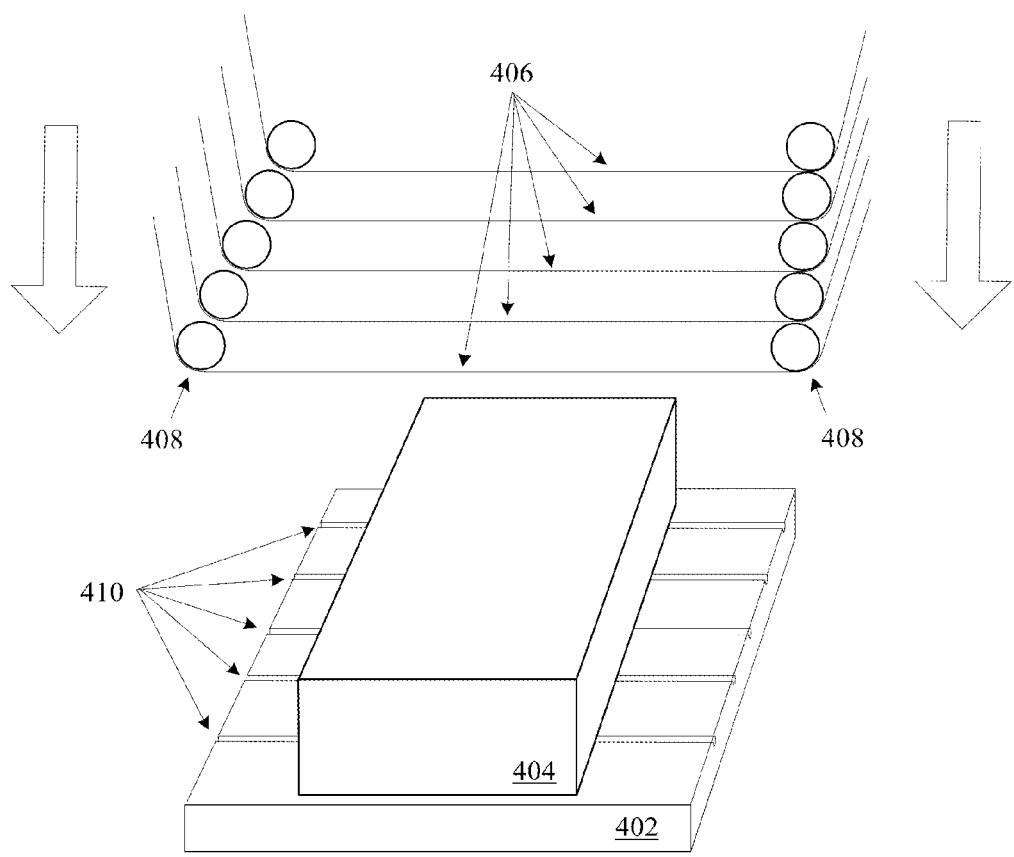
FIGS. 4A and 4B illustrate how multi-wire EDM configurations can be used to efficiently slice a ceramic magnet into a number of smaller magnets.

A FIG. 4A shows a simplified multi-wire EDM system. A workpiece holder 402 can be arranged to hold workpiece 404. Workpiece 404 can be held firmly in place by workpiece holder 402 in a number of ways including mechanically, with an adhesive, by vacuum suction or even with magnets. Wires 406 are arranged parallel to each other at a pitch distance appropriate for the size of the pieces desired to form a group of wires arranged in a single plane. In this embodiment wire guides 408 descend together until just before they contact workpiece 404, at which point the machining begins. By building slots 410 into the bottom of workpiece holder 402, wires 406 can cut all the way through workpiece 404 without doing damage to wires 406 or workpiece holder 402. One especially effective method for holding the magnets in place after the cut occurs is by covering a bottom and side portion of a workpiece in wax or epoxy. The wax can help to hold the pieces of the workpiece together after the wires pass through it. Since the width of the cuts made by the wires is quite narrow the wax can quickly solidify after the wires pass through it, thereby preventing the sliced pieces of the workpiece from separating or toppling.

Figure 4B:
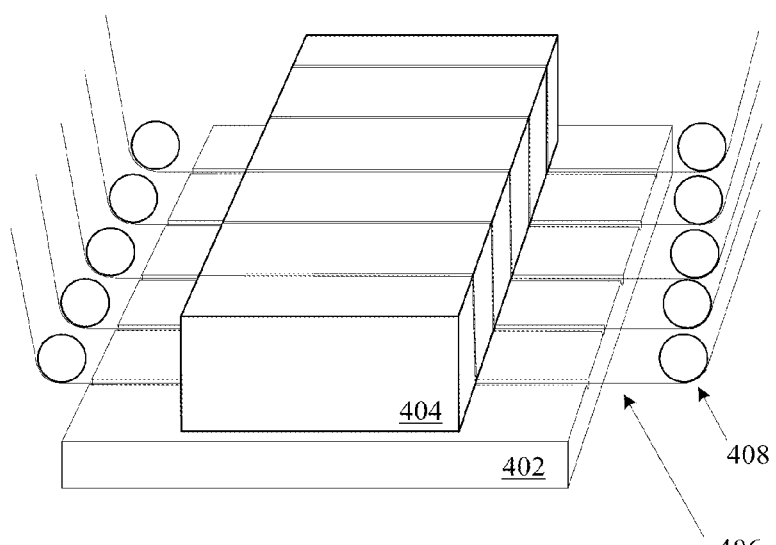

In FIG. 4B wires 406 and associated wire guides 408 are shown after cutting through workpiece 404. Wire EDM machines generally require wire guides 408 to raise wires 406 back up through workpiece 404. In situations where a follow on finishing cut is required this is quite convenient; however, when the primary purpose of the wire EDM use is to conserve material and have an implementation suitable for a manufacturing line this negatively affects both goals. By forcing a second pass machining time can be doubled, and a certain amount of additional valuable material can be removed from workpiece 404. The addition of slots 410 to workpiece holder 402 allows for a continuous machining process. Once the wires descend into slots 410, the power and wire spooling can be abated, thus saving power and wire material. Since the workpiece is still embedded in wax at this point there should be no separation of the small pieces, which can be as small as about 0.8 mm in width. An automated clamping mechanism can then be used to remove the machined workpiece 404. Another workpiece 404 can be moved into position to be cut by the wires as they rise back up again. This effectively maximizes the utility of every cut. It should also be noted that the wax or epoxy covering prevents further oxidation of the workpiece since it substantially seals the surface from any contact with the atmosphere. As a result the machined wax covered block can be taken to a safe environment before being separated and coated with a surface protectant.

Figure 5A:
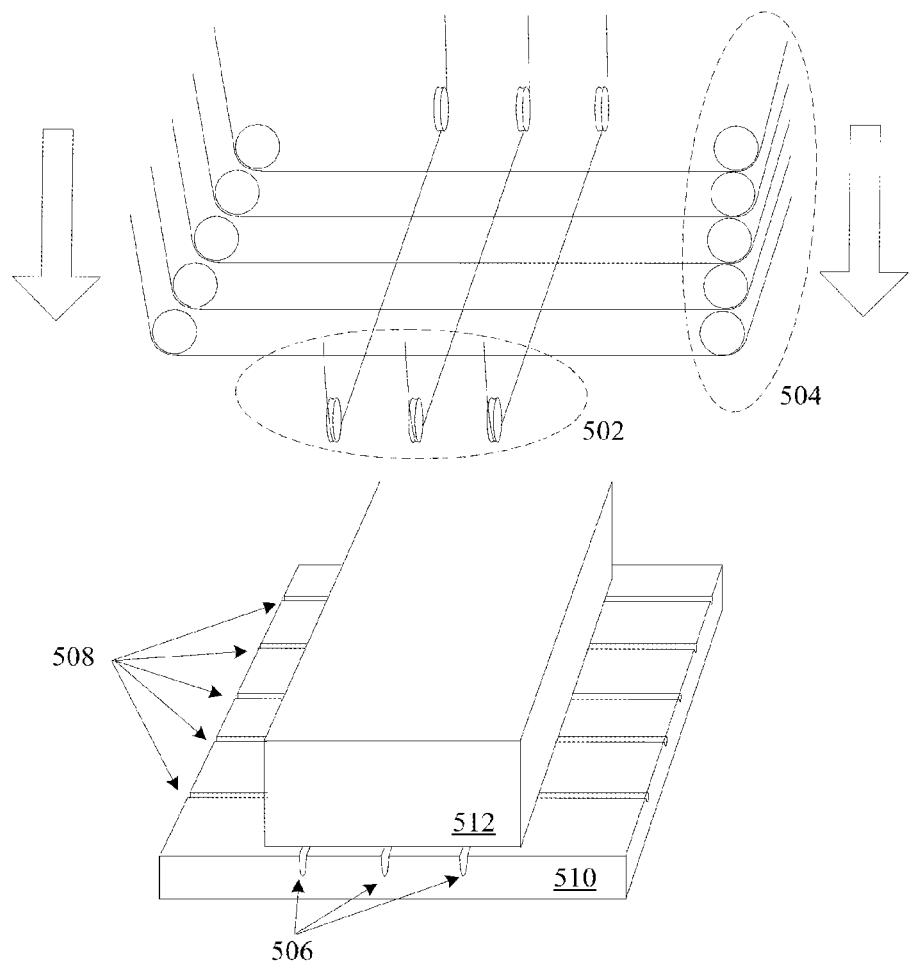
FIGS. 5A and 5B illustrate how a cross-hatched multi-wire EDM configuration can be used to create further efficiencies when slicing ceramic magnets.
Figure 5B:
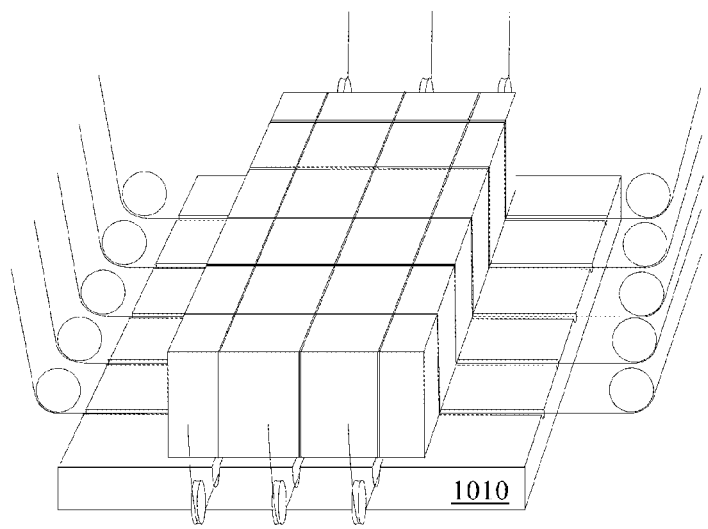
Figure 5C:
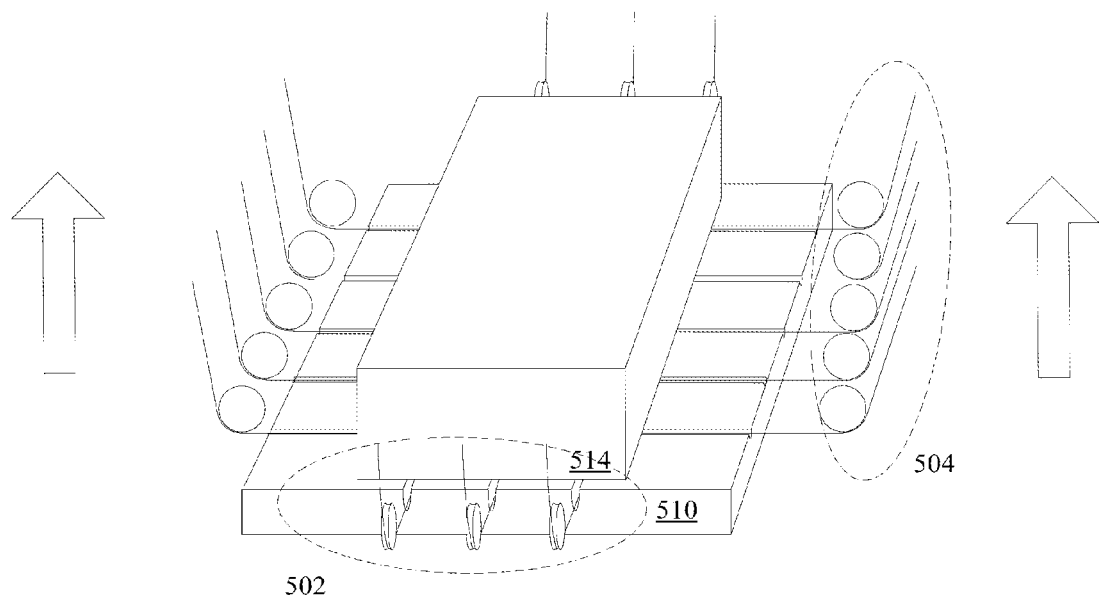
FIG. 5C shows how a machined workpiece can be replaced with a new workpiece to increase wire cutting efficiency.

FIG. 5A shows a cross-hatched configuration for wire EDM use. When cutting is required in more than one direction, the configuration illustrated in FIGS. 4A and 4B require the workpiece to be reoriented for a second cut. In the cross-hatched configuration illustrated in FIG. 5A parallel wire EDM wires 502 are arranged at 90 degree angles with respect to parallel wire EDM wires 504. This allows wire EDM wires 504 to follow wire EDM wires 502 at a close distance, essentially removing the time required to reorient the workpiece and perform a second cut. Adding deeper slots 506 to shallow slots 508 in workpiece holder 510 provides sufficient separation between the wires after cutting through workpiece 512. After a single cutting pass is performed, the machined workpiece can be vertically lifted off workpiece holder 510. A new workpiece can then be placed on workpiece holder 510 before wire EDM wires 502 and 504 travel back up in the opposite direction. FIG. 5B simply illustrates wire EDM wires 502 and 504 sitting in workpiece holder 512 after a first wire EDM cutting process is complete. After the first cutting operation is complete workpiece 512 can be removed, and replaced with workpiece 514, as shown in FIG. 5C. Parallel wire EDM wires 502 and 504 can then cut in the opposite direction of the first cut through workpiece 514.

Figure 6:
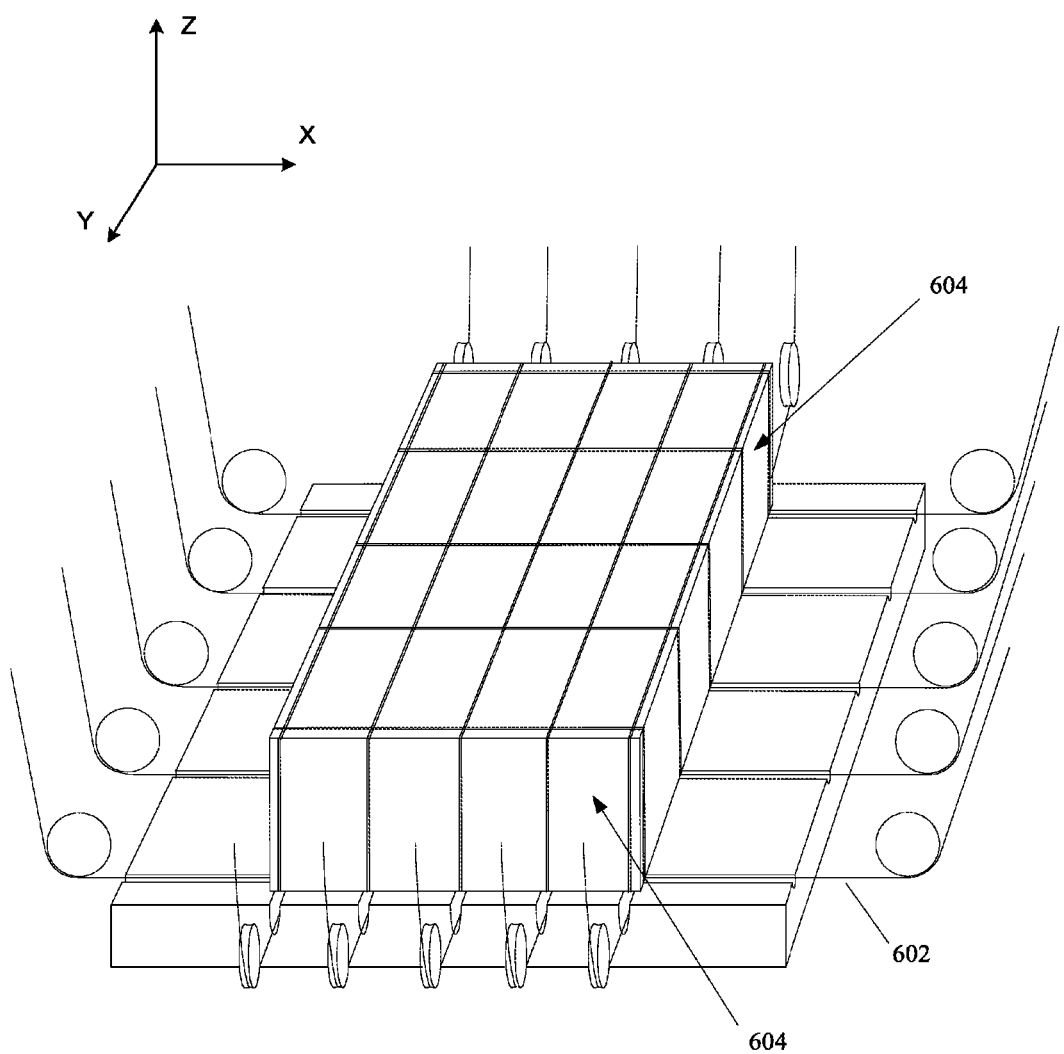
FIG. 6 shows how cross-hatched multi-wire EDM can be used to cut away an oxidation layer formed on the outside of a workpiece.

FIG. 6 shows another advantage of using a cross-hatched configuration for cutting magnets. When rare earth magnets are formed the outer portion is susceptible to oxidation. This is why rare earth magnets are coated after the final shape and finish is achieved. Unfortunately, during the production process a layer of oxidation typically forms on the outside of the magnets and must be ground away, adding additional time to the overall manufacturing process. Prior to making any cuts to the workpiece, (in this specific described embodiment demagnetized sintered rare earth magnets) the workpiece goes through a lapping process to make the bottom smooth, so that the workpiece can sit flat on the workpiece holder as the wires pass through it. In this way a stable datum can be established along a bottom surface of the workpiece. This step has the additional benefit of effectively removing the oxidation layer from the bottom surface of the workpiece; a two sided lapping machine can simultaneously smooth the top surface as well. In a subsequent step wires 602 shown in FIG. 6, can be configured to remove a small border layer 604 from the sides of the workpiece as it machines the workpiece in the Z-axis. Ideally border layer 604 only contains oxidized material that would need to be ground away. The cuts made by the wires can produce smooth production ready cuts as they slice. So assuming the two sided lapping machine was used on the top and bottom, after a single cutting operation as illustrated, every surface of each cut out magnet can be smooth and ready for production. This allows for the post cutting grinding and tumbling steps to be skipped, or at least substantially abbreviated.

Figure 7:
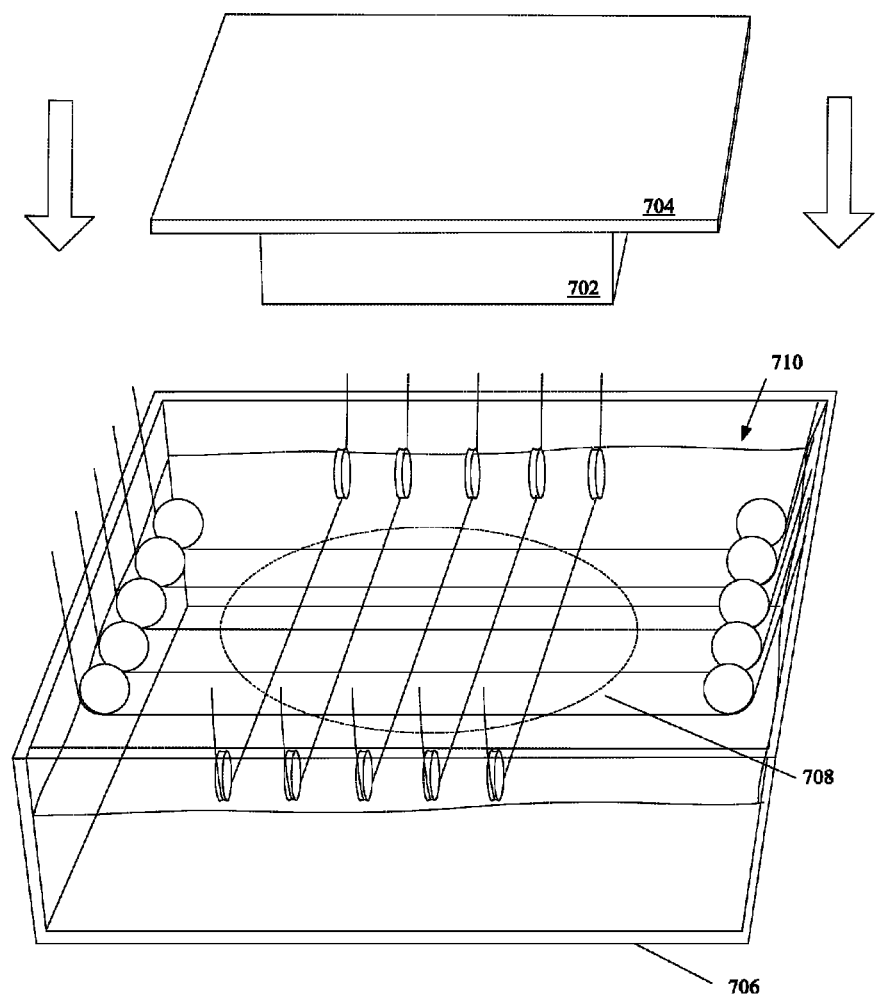
FIG. 7 shows a workpiece holder securing a workpiece from above just before the workpiece is lowered into an immersion tank.

FIG. 7 shows workpiece 702 mechanically coupled to workpiece holder 704. This allows workpiece 702 to be lowered into immersion tank 706 where EDM wires 708 can be positioned far enough below the surface of working fluid 710 to maintain continuous immersion during the cutting process. Grooves are not depicted in workpiece holder 704 since the continuous machining process is impractical with this given configuration; for the continuous method to be employed workpiece 702 would have to be swapped out while inside the immersion tank with workpiece holder 704 above it. Therefore in one embodiment wire EDM wires 708 can move partially through a wax layer that the workpiece is embedded in before moving back through the workpiece as it is removed from immersion tank 706. This configuration is especially well suited for an immersion configuration since it allows the workpiece to move in and out of the immersion tank without the need for a separate process step where a hand or mechanized picker pulls workpiece 702 off of workpiece holder 704 after a completed cutting operation.

The use of a hybrid electrolyte working fluid in immersion tank configurations can also be very beneficial. As mentioned earlier one disadvantage to the immersion tank configuration is that the scrap material isn't flushed away from the cutting area as effectively. This can slow the overall cutting speed of an already time consuming process. The hybrid electrolyte working fluid can include a detergent agent that helps to dissipate the scrap material removed from the workpiece thereby reducing incidents of cutting speed slow down due to material build up across the cutting surface.

Although the wire configurations of the example embodiments have shown a rectangular workpiece and perpendicular wire directions, the contemplated embodiments extend beyond these examples. For example a circular or oval workpiece could be used. In another alternative embodiment a third or fourth set of wires could be simultaneously lowered through the workpiece, allowing for triangular shapes, or any number of other resulting polygon shapes. Another significant advantage of wire cutting is that the wires can be easily maneuvered through the workpiece in a number of different directions. This advantage can be applied in a cross-hatched configured wire cutting setup to machine magnets having curved surfaces, as will be demonstrated in the following figure. It should be noted that the wire cutting machining methods described in FIGS. 2-7 can be used in conjunction with the following embodiments, those efficiencies including: the introduction of the continuous machining process described under FIGS. 4A-4B; the cross-hatched machining process described in FIGS. 5A-5C; and the oxidized material trimming process described in FIG. 6.

Figure 8A:
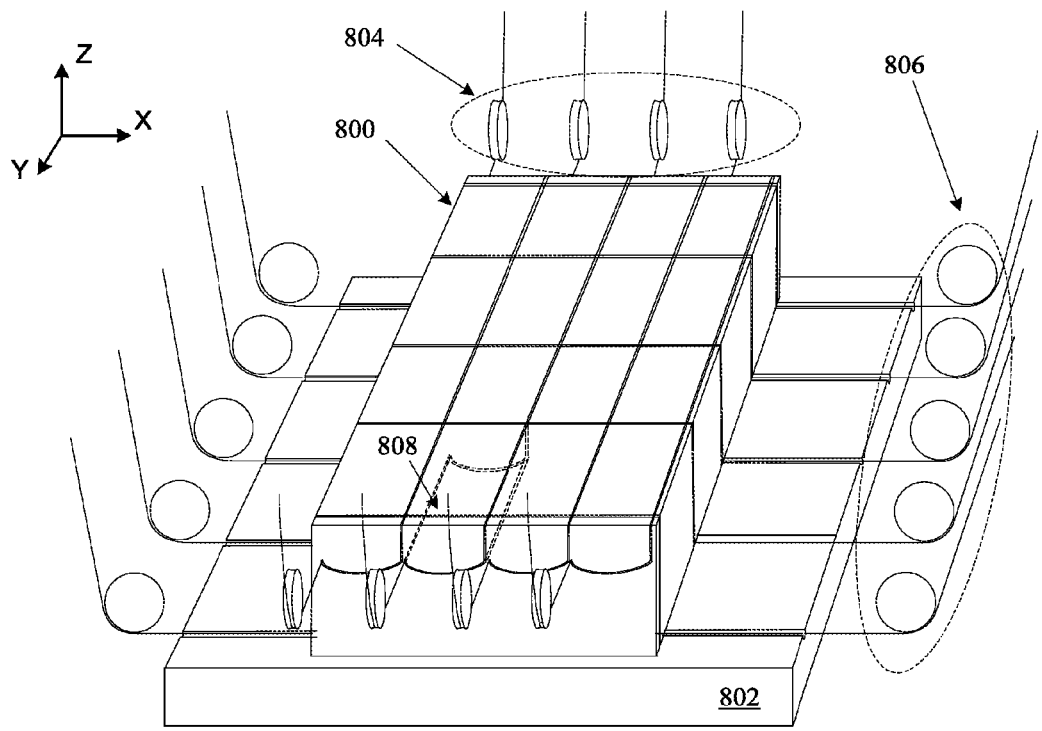
FIGS. 8A and 8B show how wire cutting machines can be used to machine complimentary puzzle piece type magnets in large quantities, in accordance with the described embodiment.
Figure 8B:
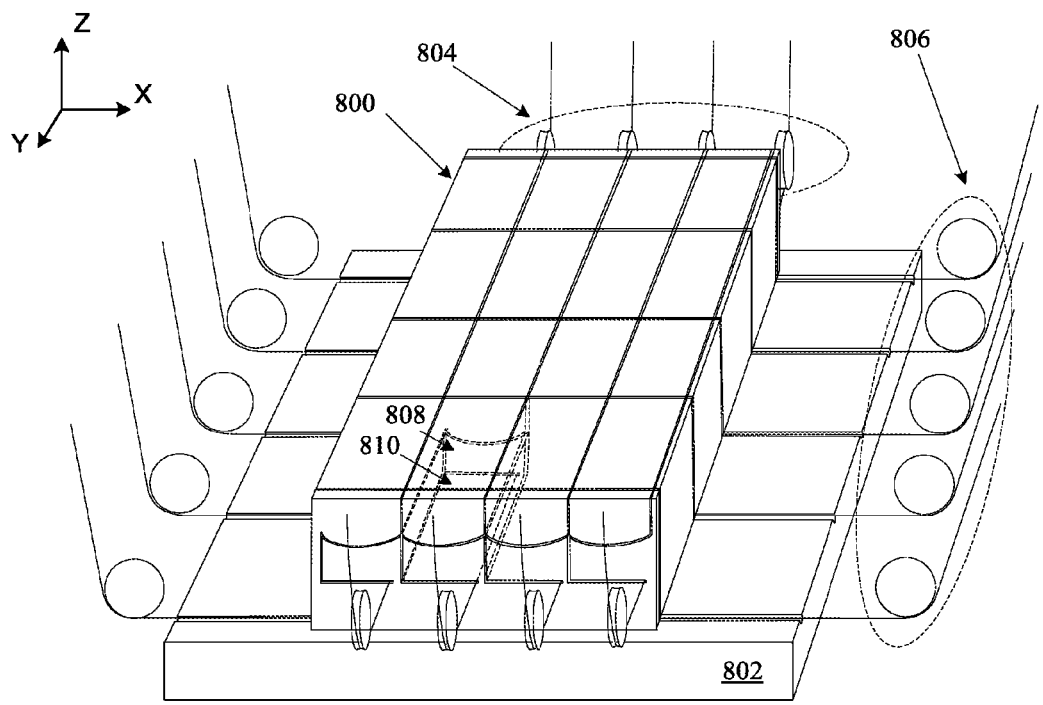

FIGS. 8A-8B shows a cross-hatched multi-wire configuration used to cut a magnetic substrate into a number of conformally shaped magnets. In one embodiment of FIG. 8A a cross-hatched configuration is shown in which workpiece 800 can be maneuvered in both the X and Z axes with respect to cutting wires 804 and 806 by workpiece holder 802. By giving workpiece holder 802 freedom to move in the X and Z axes, cutting wires 804 can be held in a fixed position while the cutting operation occurs. In other embodiments cutting wires 804 and 806 can maneuver while workpiece 800 is held stationary and in yet other embodiments the wire movement through the workpiece can be accomplished by a combination of movements from both workpiece holder 802 and cutting wires 804 and 806. It should be noted that in all cases a standoff distance can be established between cutting wires 804 and 806 to prevent interference between the cutting wires during cutting operations. All these embodiments allow the previously mentioned puzzle pieces to be cut from workpiece 800. Upper magnet 808 is shown nearly completely machined at this point in the machining process. Meanwhile, cutting wires 806 are shown having cut workpiece 800 into slices matching the desired end length of the finished magnets. Cutting wires 806 trace a straight line through workpiece 800 since in this particular exemplary described embodiment workpiece 800 is not maneuvered in the Y axis.

FIG. 8B shows how cutting wires 804 can also cut out lower magnet 810 just below upper magnet 808. In this way a number of magnets can be cut from single blocks similar to workpiece 800. In some cases workpiece 800 can be taller and wider. This would allow for an even large number of magnets to be simultaneously machined from a single magnetic workpiece 800. Such a configuration could include a correspondingly larger number of wires, cutting an increased number of rows and columns into a larger workpiece. It should be noted that while the exemplary figure shows a simple curve between the complimentary magnets, cutting wires 806 could cut any number of complex curved surfaces between the two surfaces, including for example more of a waved surface, or even a combination of curved surfaces and hard corners.

Figure 9:
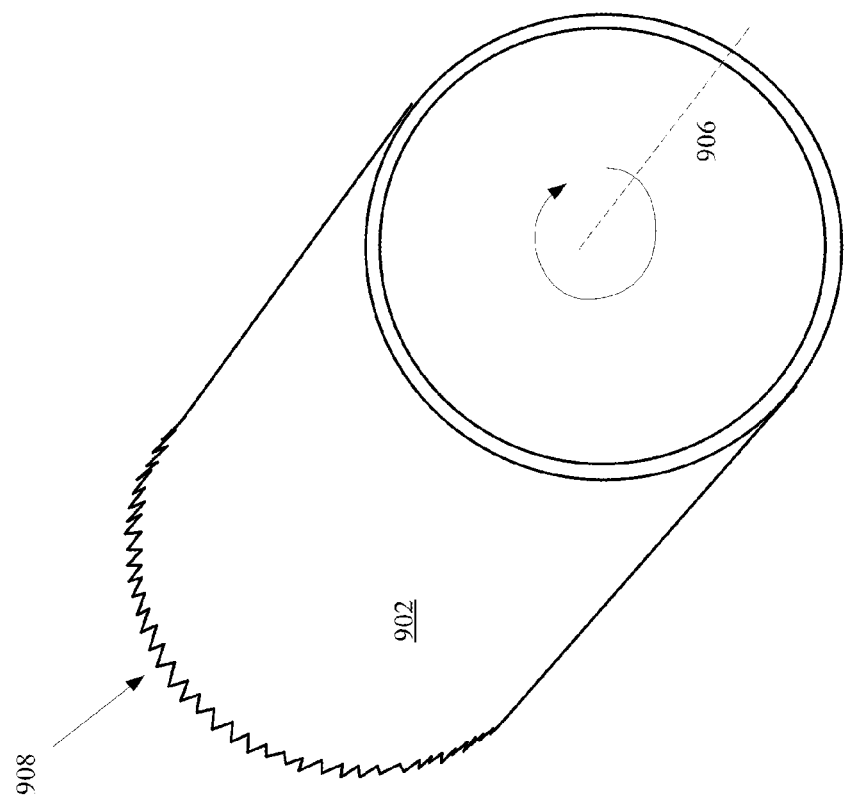
FIG. 9 illustrates how a hollow circular cutter can be used to cut complementary magnets in accordance with the described embodiments.
Figure 9:
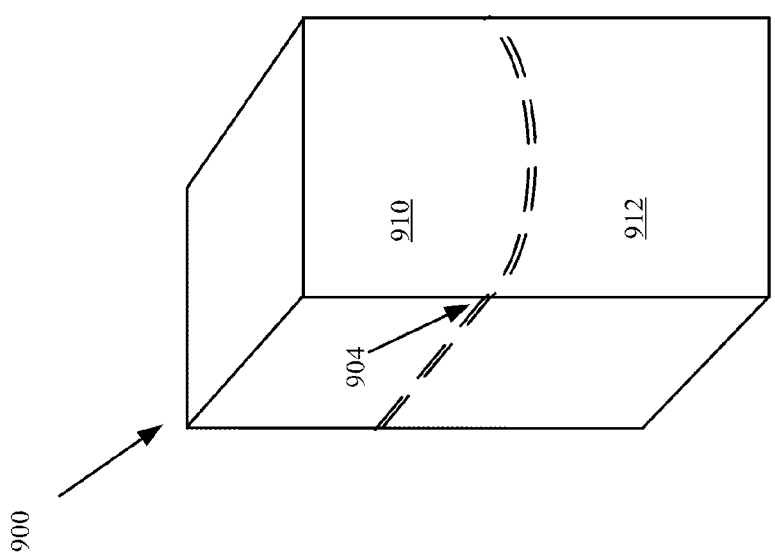

FIG. 9 shows yet another way to machine complimentary puzzle shaped pieces from single workpiece 900. In this embodiment hollow circular cutter 902 can be used to machine curved cut 904. Hollow circular cutter 902 spins around rotational axis 906. Rotational axis 906 of hollow circular cutter 902 is oriented at an angle normal to the surface of workpiece 900 during machining when a curved cut 904 is desired to be run perpendicular to the surface of workpiece 900. Cutting surface 908 of hollow cutting tool 902 can be coated in diamond to overcome the brittle nature of the magnetic material in workpiece 900. Once hollow circular cutter 902 passes completely through workpiece 900 and completes curved cut 904 the machining process is complete. Resulting upper magnet 910 and lower magnet 912 may require some finishing along the surfaces of curved cut 904, but can be substantially the correct shape and size after a single machining cut. While this particular embodiment doesn't scale quite as well as the multi-wire cutting wire configurations demonstrated in FIG. 4, in most configurations a diamond saw moves through magnetic material faster than cutting wires. Varying the curvature of cuts for this particular embodiment is achievable by obtaining a number of hollow circular cutters 902 each one having a diameter in accordance with the desired curvature of curved cut 904. In large manufacturing operations a specific curvature hollow circular cutter 902 can be sized to fit whatever curvature is desired for the applicable workpiece. Similarly, other alternate cutting methods can be applied to create the magnetic puzzle pieces of the described embodiment. Both water jet cutting and laser cutting are both possible methods; however, curved cut 904 would have to be of limited depth.

Figure 10:
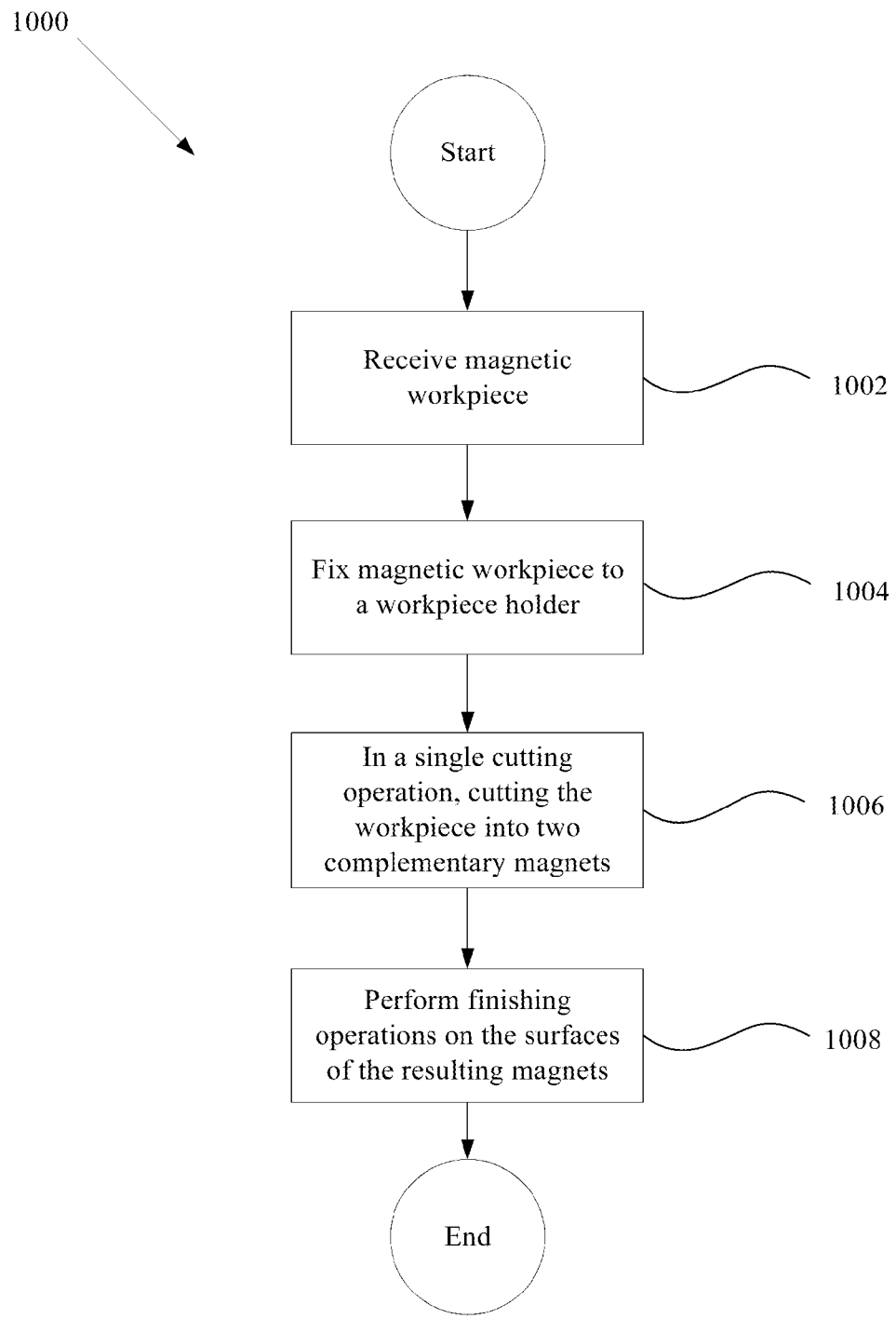
FIG. 10 shows a flowchart detailing a general manufacturing process for efficiently cutting magnets with curved, complementary surfaces.

FIG. 10 shows a flowchart detailing manufacturing process 1000 for cutting magnets with complementary surfaces from a larger magnet. In step 1002 a magnet is received. The described embodiment can work with any type of magnet; however the described embodiment is optimized to be applied to workpieces made from brittle, costly magnetic material such as rare earth type magnets. In step 1004 the magnet is fixed to a workpiece holder. In some embodiments the workpiece holder can be stationary, while in other embodiments the workpiece holder can be manually or automatically manipulated through a number of degrees of freedom to assist in guiding a cutting tool through the magnet. In step 1006 a curved cut is made through the magnet creating a complementary surface in a single cutting operation between two resulting pieces from the original. No grinding step should be necessary to further refine the shape of the complementary surfaces created. In some embodiments certain surface finishing treatments can be useful for sealing the magnetic material and/or providing a desirable surface finish not achieved in the cutting operation. In step 1008 finishing operations can be the newly clad aluminum magnet receives a surface treatment providing a uniform aluminum Oxide layer, which then undergoes a variety of surfacing and coating steps to get it to match whatever surface it will be applied to. After this process is complete and once the magnet has been coated and surfaced the magnet can receive its magnetic charge. This prevents the magnetic field strength from being adversely affected by any heat producing stage in the manufacturing process.

The aforementioned cutting machines generally use computer numerical control (CNC) components to direct the operation of the cutting machine. CNC components built into a cutting machine allow an operator to input a set of designs into a computer coupled to a cutting machine. The computer then has a processor which executes the commands input by the operator, and directs the movement of the cutting machine in a precise and repeatable manner. Although an operator will typically supervise operation of the CNC machines, processes can be set up to execute automatically without any need for human intervention.

The foregoing description, for purposes of explanation, used specific nomenclature to provide a thorough understanding of the invention. However, it will be apparent to one skilled in the art that the specific details are not required in order to practice the invention. Thus, the foregoing descriptions of specific embodiments of the present invention are presented for purposes of illustration and description. They are not intended to be exhaustive or to limit the invention to the precise forms disclosed. It will be apparent to one of ordinary skill in the art that many modifications and variations are possible in view of the above teachings.

The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

What is claimed is:

1. A method of cutting a magnetic substrate, the method comprising:
    moving a workpiece holder in at least two axes to maneuver the magnetic substrate coupled thereto through a number of cutting wires to form at least two magnets having complementary curved surfaces;
    maintaining a minimum clearance distance between at least two anti-parallel sets of the cutting wires;
    adjusting a pitch value between parallel cutting wires in accordance with one dimension of the magnets; and
    removing the magnetic substrate from the wire cutting machine in a single operation after a series of cutting operations,
    wherein the magnetic substrate is held together in a single block by a coating selected from the group consisting of wax and epoxy.

2. The method as recited in claim 1, comprising:
    adjusting a wire path of the cutting wires in accordance with a curvature value desired for the complementary curved surface.

3. The method of claim 1, wherein the wherein the number of cutting wires is fixed in place and the workpiece holder is configured to maneuver the workpiece in both an X axis and a Z axis with respect to the plurality of cutting wires.

4. The method of claim 1, wherein the number of cutting wires is movable with respect to the workpiece and the workpiece holder is fixed in place.

5. The method of claim 1, wherein two of the at least two sets of cutting wires are orthogonally aligned.

6. The method of claim 5, wherein each of the number of cutting wires in each of the cutting wire sets has a corresponding slot in the workpiece holder arranged to receive it.

7. The method of claim 1, wherein the magnetic substrate is a demagnetized rare earth magnet.

8. The method of claim 1, further comprising, immersing the portions of the number of wires that are in close proximity to the magnetic substrate in a working fluid when moving the magnetic substrate through the number of cutting wires.

9. The method of claim 1, wherein the number of cutting wires are wire saw cutting wires.

10. The method of claim 1, wherein the number of cutting wires are electrical discharge machining (EDM) cutting wires.

11. The method of claim 1, wherein the magnetic substrate is coupled to the workpiece by vacuum suction.

* * * * *